United States Patent
Kim (10) Patent No.: US 9,160,199 B2
(45) Date of Patent: Oct. 13, 2015

(54) SYSTEM FOR CUTTING OFF STANDBY POWER

(76) Inventor: Chang-Ho Kim, Seoul (KR)

( * ) Notice: Subject to any disclaimer, the term of this patent is extended or adjusted under 35 U.S.C. 154(b) by 267 days.

(21) Appl. No.: 13/703,753

(22) PCT Filed: Jun. 20, 2011

(86) PCT No.: PCT/KR2011/004486
§ 371 (c)(1),
(2), (4) Date: Dec. 12, 2012

(87) PCT Pub. No.: WO2011/162517
PCT Pub. Date: Dec. 29, 2011

(65) Prior Publication Data
US 2013/0088079 A1    Apr. 11, 2013

(30) Foreign Application Priority Data
Jun. 21, 2010 (KR) .................. 10-2010-0058387

(51) Int. Cl.
  *H02J 3/14*    (2006.01)
  *H02J 1/00*    (2006.01)
  *H02J 9/00*    (2006.01)
  *G06F 1/32*    (2006.01)

(52) U.S. Cl.
CPC .............. *H02J 9/00* (2013.01); *G06F 1/3209* (2013.01); *G06F 1/3287* (2013.01); *H02J 9/005* (2013.01); *G06F 2200/261* (2013.01); *Y02B 60/1282* (2013.01); *Y02B 60/1296* (2013.01); *Y02B 60/32* (2013.01); *Y02B 60/50* (2013.01); *Y10T 307/406* (2015.04)

(58) Field of Classification Search
USPC ........ 307/31, 52, 60, 112, 116, 125, 126, 11, 307/115, 131
See application file for complete search history.

(56) References Cited

U.S. PATENT DOCUMENTS

| | | | |
|---|---|---|---|
| 7,830,041 B2* | 11/2010 | Yang et al. | 307/115 |
| 2005/0010964 A1 | 1/2005 | Sano et al. | |
| 2006/0052905 A1* | 3/2006 | Pfingsten et al. | 700/286 |
| 2007/0101407 A1* | 5/2007 | Cheung et al. | 726/4 |
| 2008/0231121 A1* | 9/2008 | Yang et al. | 307/131 |
| 2009/0150509 A1* | 6/2009 | Chang et al. | 709/208 |
| 2009/0235107 A1* | 9/2009 | Gelonese | 713/340 |

FOREIGN PATENT DOCUMENTS

| | | |
|---|---|---|
| CN | 101253657 A | 8/2008 |
| JP | 2001-275278 A | 10/2001 |
| JP | 2004-355171 A | 12/2004 |
| JP | 2004355171 A * | 12/2004 |
| JP | 2005-31494 A | 2/2005 |

(Continued)

*Primary Examiner* — Rexford Barnie
*Assistant Examiner* — Rasem Mourad
(74) *Attorney, Agent, or Firm* — Jefferson IP Law, LLP (57) ABSTRACT

A system for cutting off standby power of the present invention comprises: a plurality of electronic products that are controlled devices; and a main system commonly controlling the same, wherein each of the plurality of electronic products is equipped with a standby power cut-off unit, which is controlled by the main system to open or cut off the power supply path of the power input of a corresponding electronic product, thereby cutting off standby power, and wherein the main system is equipped with a device selection and actuation unit which controls the action of the standby power cut-off unit of each of the electronic products to supply or cut off power to each of the plurality of electronic products.

7 Claims, 5 Drawing Sheets

(56) References Cited

FOREIGN PATENT DOCUMENTS

| | | |
|---|---|---|
| JP | 2008-67473 A | 3/2008 |
| JP | 2009-148061 A | 7/2009 |
| JP | 2010-88192 A | 4/2010 |
| KR | 10-2002-0054941 A | 7/2002 |
| KR | 10-2010-0005406 A | 1/2010 |
| KR | 10-2010-0030394 A | 3/2010 |
| KR | 10-2010-0062836 A | 6/2010 |

* cited by examiner

SYSTEM FOR CUTTING OFF STANDBY POWER

TECHNICAL FIELD

The present invention may be applied to a home network system or a power smart gird system in a home, office, factory, or the like, and relates to a standby power cut-off system that completely cuts off standby power of a plurality of electric/electronic products, apparatuses, factory equipment, or the like, and enables to have a function of inputting power manually or remotely.

BACKGROUND ART

In general, a home network system, a power smart grid system or the like is configured to perform on/off control or operation control for electronic products connected to the system from the outside. However, since the control of the electronic products from the outside is possible only when power plugs of the products are kept in the socket, the electronic products waste standby power, and the corresponding system always supplies the power for the control, and therefore the electric power is wasted.

In the future, it is expected that the development of the IT technology will increase the number of the electronic apparatuses, thereby increasing the waste of energy more. Due to the generation of $CO_2$ related to the increased power production, the environment contamination will be accelerated.

DETAILED DESCRIPTION OF THE INVENTION

Technical Problem

Accordingly, the present invention has been conceived for improving the problems in the conventional art as described above, and provides a standby power cut-off system that includes a standby power cut-off system (a home network, a power smart grid system, or the like) so that when the electronic products/appliances are powered "off", the standby power is completely cut off, and the power is manually turned "on" or the power supply to the product or the control may be performed remotely (via a cell phone or the like) from the outside, and enables the product to be controlled when the electronic products or apparatuses in a home, office, factory, or the like are powered "off" (the standby power is completely cut off), and a control method thereof.

Technical Solution

The electronic product according to the present invention includes standby power cut-off apparatuses 200, 300, and 400 as standby power cut-off means in order to cut off the standby power, so that the product may be powered "on", and the standby power is completely cut off when the product is powered "off" even if the plug of the product is kept in the socket.

In addition, a main system 10 includes a wireless communication unit 12 as a remote control means, a communication unit 15, a device selecting and driving unit 13 so that the product is powered "on" or controlled remotely via a cellular phone or the Internet in a state when the power of the electronic product is cut off, and enables the corresponding electronic product to be powered "on".

At this time, in a case in which the electronic product is a computer, in order to use a wake-up LAN when the computer is powered "off" and the power is completely cut off, the corresponding computer is powered "on" via a cellular phone or a telephone and a communication is performed through the wake-up LAN (WUL) 415 via the Internet so that necessary data becomes available.

In this manner, the electric power can be saved by configuring the standby power cut-off system (a home network system or a smart grid system) that can cut off the standby power, and by cutting off all the standby power when appliances/electronic products (for example, a light controlling device, a thermostat, a computer, an electronic apparatus, a smart grid controller, a cabinet panel controller, or the like) are not in use so that the power is supplied only when they are in use.

In addition, when the main system 10 does not perform a control, that is, when all the products connected to the system are turned "off", in order to cut off/supply input power for completely removing the power waste by the main system 10, the main system includes a controller 11, a driving unit 18, and a standby power cut-off apparatus 100, and includes a sleep mode power unit 14 (a super capacitor or a secondary battery) as a power means required for a minimum sleep mode after the main system 10 is powered off.

Advantageous Effects

Accordingly, the present invention provides an effect in which standby power wasted in all the electronic products used in a home, office, or factory completely cuts off, and the product can be controlled when the standby power is completely cut off so that the energy can be saved without giving inconvenience to or changing a life pattern of a user, and the generation of $CO_2$ is reduced by saving energy to prevent the environment contamination.

MODE FOR CARRYING OUT THE INVENTION

Preferred embodiments are described in detail with reference to the accompanied drawings. In the following, specific components such as a controller, a memory unit, a device selecting and driving unit, and a communication unit are described, but the specific components are provided as an example for easier understanding of the present invention. It is obvious to those skilled in the art that certain modifications or changes of the specific components may be possible.

Figure 1:
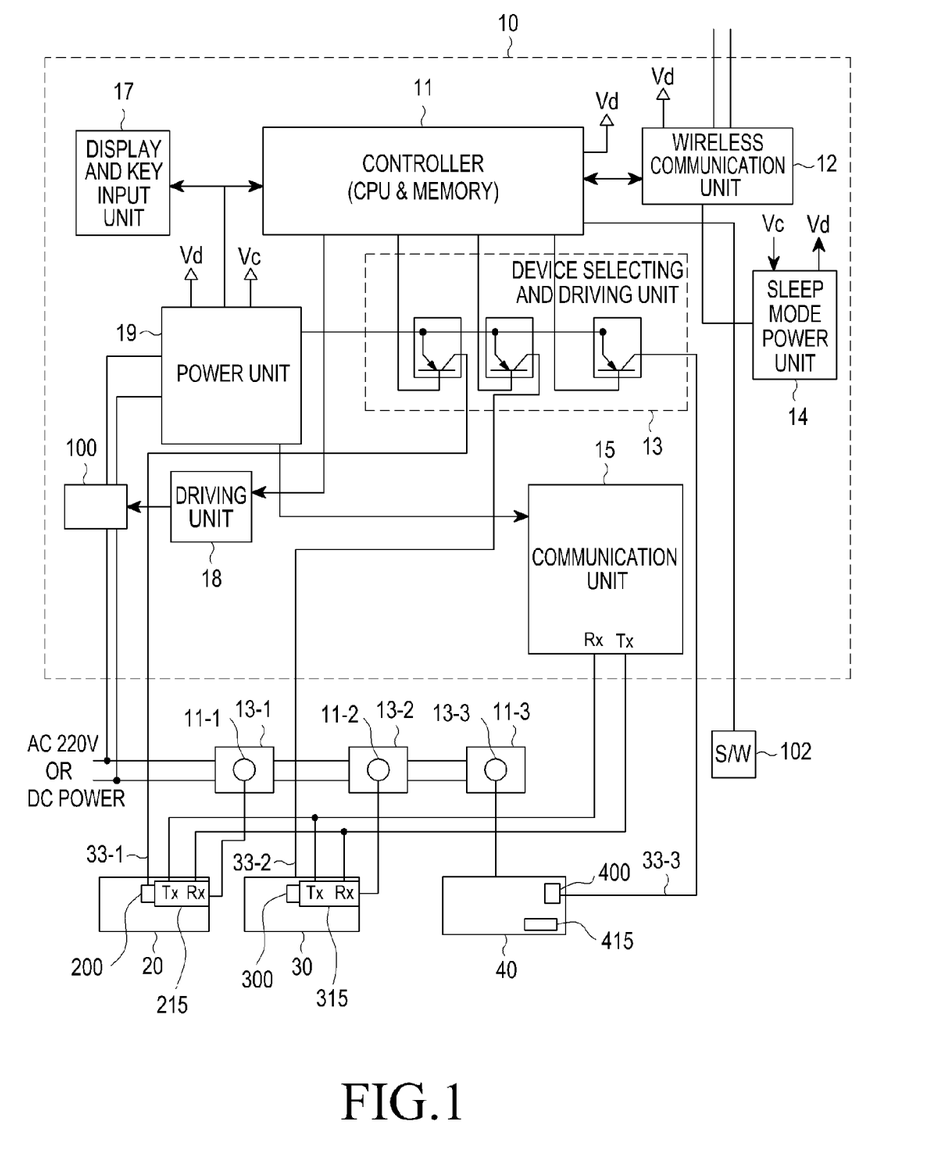
FIG. 1 is an entire block diagram illustrating a standby power cut-off system according to an embodiment of the present invention.

FIG. 1 is an entire block diagram illustrating a standby power cut-off system according to an embodiment of the present invention. With reference to FIG. 1, the standby power cut-off system according to an embodiment of the present invention includes a plurality of electronic products 20, 30, and 40, which are controlled apparatuses, a main system 10 (for example, a home network controller, a smart grid controller, or the like) which controls the plurality of the electronic products 20, 30, and 40 in an integrated manner, or the like.

First, the configuration of the main system 10 is described in detail. First, the main system 10 includes a power unit 19 for providing power to the main system 10, a controller 11 including a CPU (central processing unit) and a memory for controlling the main system 10 and storing data data, and a wireless communication unit 12 communicating with a cellular phone of an outside user to be remotely controlled by the cellular phone. In addition, the main system 10 includes a display and key input unit 17 equipped with an LCD display and a plurality of keys for performing various operations, displaying a data status, and inputting functions such as an address of the device by the user.

In addition, the main system 10 includes the power unit 19 that is provided with external power as input power and provides power for operating each function unit inside the main system 10, a standby power cut-off unit 100 that cuts off the standby power by connecting or cutting off a power supply path for the input power provided to the power unit 19 according to the driving signal of a driving unit 18 by a control of the controller 11, and includes a manual operation switch (corresponding to a knob described below) to provide a corresponding operation signal to the controller 11 at the time of an operation by a user, and the driving unit 18 that provides the driving signal to the power standby power cut-off unit 100 under the control of the controller 11.

In addition, the main system 10 includes a device selecting and driving unit 13 that operates the standby power cut-off units 200, 300, and 400 of the product and supplies power to the products in order to supply or cut off the power for the product under the control of the controller 11 when the electronic products 20, 30, and 40 to be controlled are selected, and a communication unit for performing a control for communicating with the electronic products when the power is supplied to the electronic products 20, 30, and 40.

In addition, the main system 10 includes a sleep mode power unit 14 that stops power supply by stopping the control, proceeding to a sleep mode, and cutting off the main power and supplies minimum required power, if the power of all the electronic products 20, 30, and 40 controlled by the standby power cut-off system is cut off, and the main system 10 is configured to supply power only to the controller 11, the wireless communication 12, the communication unit 15, and the like in a restricted manner and to wake up periodically or at the time of interruption for supplying power and performing a normal operation.

In addition, an overall cut-off switch 102 to be installed in a certain position at a front door of a house in order to receive an operation for cutting off the entire standby power when the user goes out, or the like is included, and the operating signal of the overall cut-off switch 102 is configured to be provided to the controller 11 of the main system 10. At this point, the controller 11 of the main system 10 cuts off the standby power of the entire electronic product, if it is detected that the overall cut-off switch 102 is pressed or all the managed electronic products are not in use. The overall cut-off switch 102 may be implemented simply by an on/off switch.

Meanwhile, the plurality of the electronic products 20, 30, and 40 are provided with the external power by putting corresponding power plugs into a plurality of sockets 13-1, 13-2, and 13-3, respectively. The external power provided to the plurality of the electronic products is provided to the power units 202, 302, and 404 through the standby power cut-off units 200, 300, and 400.

Figure 2:
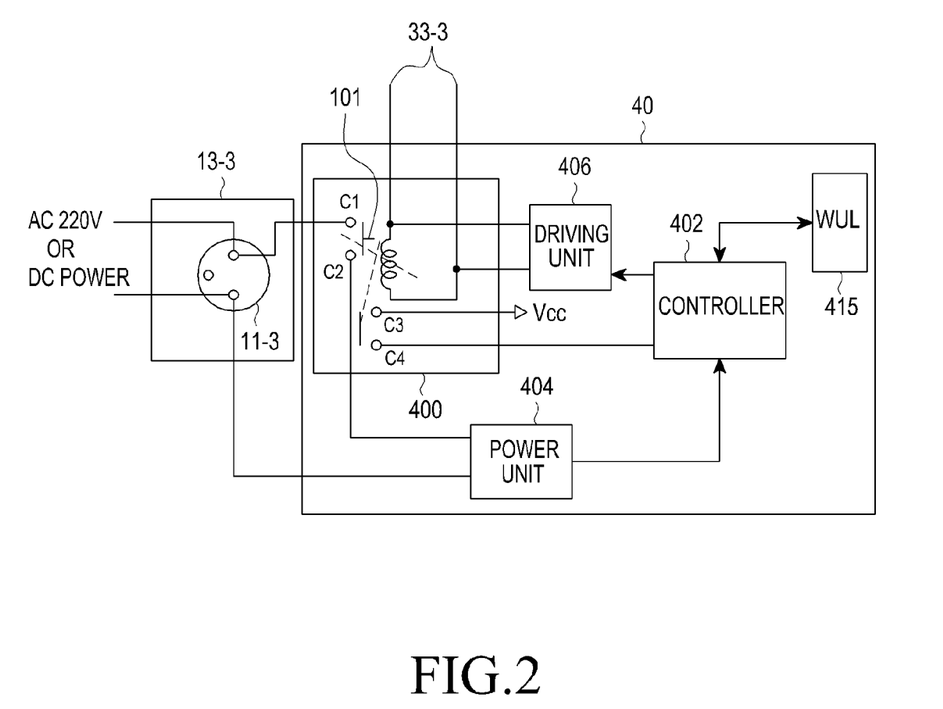
FIG. 2 is a detailed block diagram illustrating a third electronic product and relating units in FIG. 1.
Figure 3:
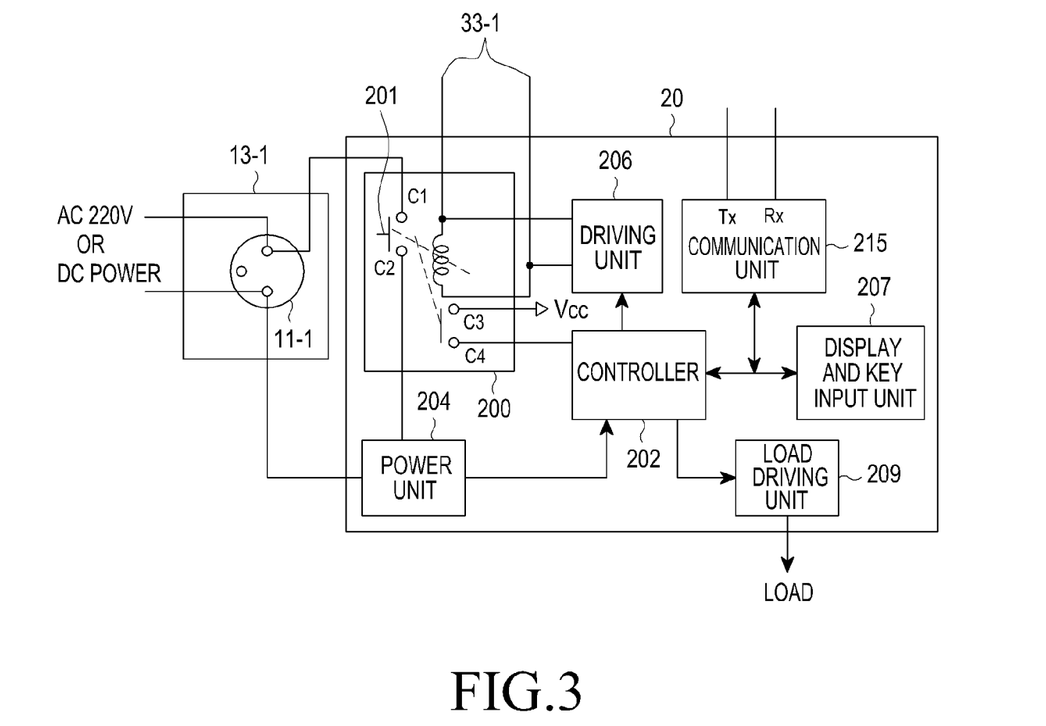
FIG. 3 is a detailed block diagram illustrating a first electronic product and relating units in FIG. 1.
Figure 4:
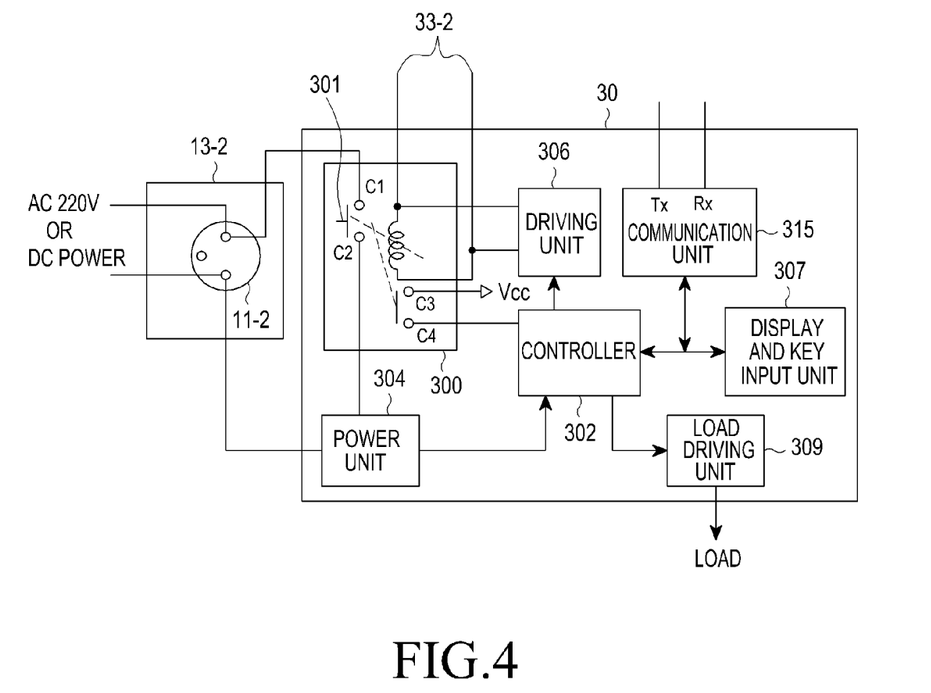
FIG. 4 is a detailed block diagram illustrating a second electronic product and relating units in FIG. 1.

FIGS. 2 to 4 illustrate detailed configurations of the plurality of the electronic products 20, 30, and 40. For example, FIGS. 2 to 4 illustrate configurations of the first electronic product 20, the second electronic product 30, and the fourth electronic product 40, respectively.

With reference to FIGS. 2 to 4, the electronic products 20, 30, and 40 respectively include power units 204, 304, and 404 that receive external power as input power and provide the power for operating each function unit inside the electronic products 20, 30, and 40, standby power cut-off units 200, 300, and 400 that cut off standby power by connecting or cutting off the power supply paths of the input power provided to the power units 204, 304, and 404 according to the driving signals of the driving units 206, 306, and 406 by the control of the controllers 202, 302, and 402 of the products and include manual operation switches (corresponding to knobs described below) to provide corresponding operation signals to the controllers 202, 302, and 402 at the time of an operation by a user, and the driving units 206, 306, and 406 that provide the driving signals to the power standby power cut-off units 200, 300 400 under the control of the controllers 202, 302, 402.

At this point, standby power cut-off units 200, 300, and 400 of the respective electronic products 20, 30, and 40 are configured to connect or cut off the power supply paths of the input power by the control from the device selecting and driving unit 13 of the main system 10. Accordingly, the main system 10 can control supplying/cutting off power for the selected products.

At this point, the first and second electronic products 20 and 30 illustrated in FIGS. 3 and 4 include display and input units 207 and 307 for receiving function settings according to the functions thereof from the user and displaying the operation state and data, and include a load driving unit 209 for driving connected loads (not illustrated) according to the control condition.

In addition, the first and second electronic products 20 and 30 respectively include communication units 215 and 315 for communication with the communication unit 15 of the main system.

At this point, the third electronic product 40 illustrated in FIG. 2 may be a computer, for example. In such a case, the third electronic product 40 includes a wake-up LAN (WUL) 415 for connecting to the Internet so that the user may read, write, and manage data.

Figure 5:
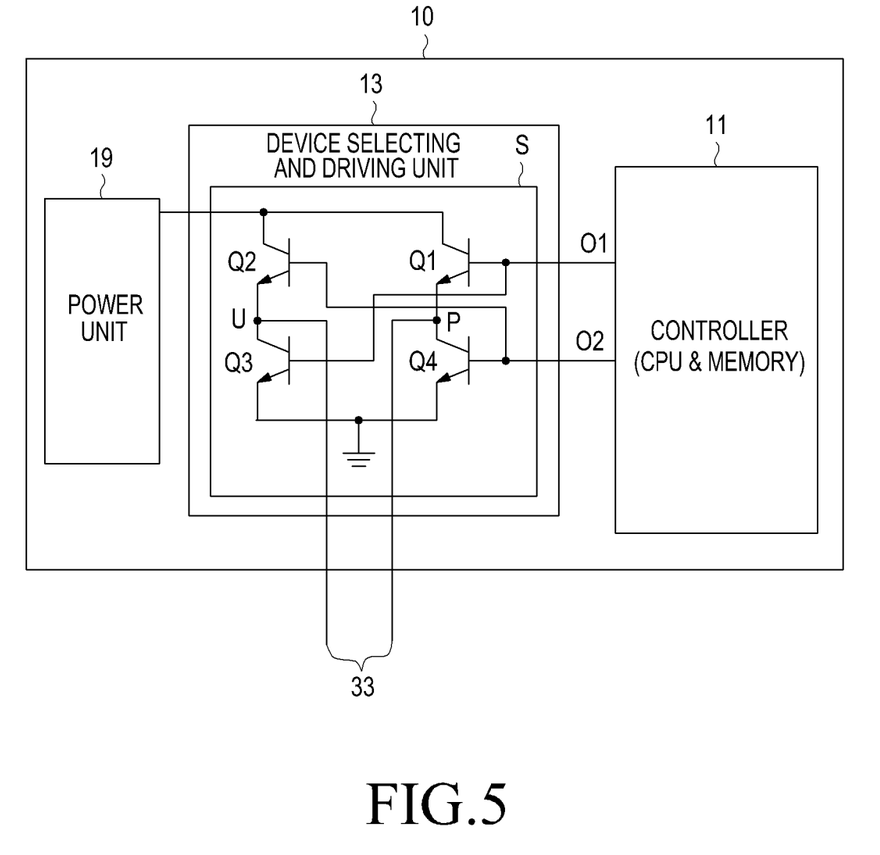
FIG. 5 is a detailed block diagram illustrating a device selecting and driving unit and relating units of a main system in FIG. 1.

FIG. 5 is a block diagram illustrating the device selecting and driving unit 13 of the main system 10 in FIG. 1 and the relating units in detail. The device selecting and driving unit 13 are configured so that each of the plurality of the electronic products 20, 30, and 40 includes one driving switch S and controls an electronic product in a separated manner. For example, FIG. 5 illustrates one driving switch S as a representative.

Referring to FIG. 5, each driving switch S may be implemented by a structure for connecting the first to fourth transistors (NPN-type switching transistors Q1, Q2, Q3, and Q4) that perform switching according to the switching control signal provided from the controller 11.

At this point, the first and second transistors Q1 and Q2 receive the operating power provided from the power unit 19 through an input (for example, a collector terminal), an output of the first transistor Q1 (for example, an emitter terminal) is connected to the first terminal of the solenoid described below inside the standby power cut-off units 200, 300, and 400, and an output (an emitter terminal) of the second transistor Q2 may be connected to the second terminal of the solenoid (a point U). In addition, an input (a collector terminal) of the third transistor Q3 is connected to the second terminal of the solenoid, an output (an emitter terminal) is connected to a ground terminal, an input of the fourth transistor Q4 is connected to the first terminal of the solenoid (a point P), and an output (an emitter terminal) is connected to a ground terminal.

At this time, the first and third transistors Q1 and Q3 commonly receive the switching control signals output from a first output O1 of the controller (through the base terminal), and the second and fourth transistors Q2 and Q4 commonly receive the switching control signals output from a second output O2 of the controller 11 (through the base terminal).

According to the structure, the controller 11 output control signals from the first output O1 or the second output O2 at the time of the on/off control to change the polarity of a line 33 connected to the solenoid. As a result, polarity of the line 33 connected to the solenoid inside the standby power cut-off apparatuses 200, 300, and 400 of the respective electronic products 20, 30, and 40 is changed to connect or cut off the power paths.

Meanwhile, the detailed configurations of the driving units 206, 306, and 406 inside the respective electronic products 20, 30, and 40 may be the same as the configuration of the driving switch S, and the driving units 206, 306, and 406 may operate according to the control signals from the corresponding controllers 202, 302, and 402.

Hereinafter, the operation of the standby power cut-off system according to the present invention is described with reference to FIGS. 1 to 5. First, in the driving switch S of the device selecting and driving unit 13, the collectors of the first and second transistors Q1 and Q2 are commonly connected to the power of the power unit 19, the emitters of the third and fourth transistors Q3 and Q4 are commonly connected to the ground, and a point P at which the emitter of the first transistor Q1 and the collector of the fourth transistor Q4 are connected and a point U at which the emitter of the second transistor Q2 and the collector of the third transistor Q3 are connected are connected to the solenoid line 33 of the standby power cut-off units 200, 300, and 400 of each product. Therefore, if a "high" pulse output is transmitted from the first output O1 of the collector 11 in order to power "on" the specific product, this is applied to the bases of the first and third transistors Q1 and Q3 commonly connected to the first output O1. According to O, the first and third transistors Q1 and Q3 are turned "on", the current flows to the solenoid of the standby power cut-off units 200, 300, and 400 of the corresponding electronic products 20, 30, and 40 from the point P to the point U, so that the contact points C1 and C2 of the standby power cut-off units 200, 300, and 400 of the corresponding products are connected, the power is supplied to the corresponding products, and the products operates normally.

Otherwise, if a "high" pulse output is transmitted from the second output O2 of the collector 11 in order to power "off" the specific product, this is applied to the bases of the second and fourth transistors Q2 and Q4 commonly connected to the second output O2. According to O, the second and fourth transistors Q2 and Q4 are turned "on", the current flows to the solenoid of the standby power cut-off units 200, 300, and 400 of the corresponding electronic products 20, 30, and 40 from the point U to the point P, so that the contact points C1 and C2 of the standby power cut-off units 200, 300, and 400 of the corresponding products are open, the power supplied to the corresponding products is cut off, and the standby power of the products is completely cut off.

The operation when the electronic product is manually powered "on" from the state in which the electronic product is powered "off" is described. When the user presses knobs 201, 301, and 401 included in the standby power cut-off units 200, 300, and 400 in order to power "on" the electronic products 20, 30, and 40, the contact points C1 and C2 connected thereto are connected, the power units 204, 304, and 404 generate and supply power required to the product when the power is supplied to the product through a plug 11 of a socket 13, and therefore the electronic products 20, 30, and 40 normally operate.

When the normal operation of the electronic product is completed or the knobs 201, 301, and 401 of the standby power cut-off units 200, 300, and 400 are manually pressed in order to cut off the power, the contact points C3 and C4 of the tact switch coupled with the product are connected and the signals are transmitted to the controllers 202, 302, and 402 of the product. When the controllers 202, 302, and 402 detect the signals, the control signals are transmitted to the driving units 206, 306, and 406, the current flows to the solenoid of the standby power cut-off units 200, 300, and 400, the contact points C1 and C2 are open, the power supply is cut off, and therefore the standby power is completely cut off.

In a case in which the first and second electronic products 20 and 30 that communicate with the main system 10, if an interruption is requested to the main system 10 through the communication units 215 and 315, the main system 10 processes the interrupt request through the communication unit 15, it is determined that that the electronic products operate normally, communications are performed periodically or when an event occurs, and normal control is performed. Here, any communication methods including RA-422, RA-485, and the like may be performed.

In addition, in a case of a product that does not need to communicate with the main system 10 such as the third electronic product 40 (for example, a computer), after only the corresponding product is selected and the power is supplied, the product may be controlled, for example, by selectively supplying the power, reading, modifying, and storing data through the Internet communication (wake-up LAN function).

During the normal operation as described above, if the main system 10 turns off the electronic product through a cellular phone from the outside (for example, in a case of a home network system), or the main system 10 analyzes the used power amount and forcibly powers off the corresponding electronic product according to the priority (for example, in case of a smart grid controller), the controller 11 selects the driving switch S of the corresponding product in the device selecting and driving unit 13, and transmits a "high" pulse output from the second output O2 of the controller 11 in order to power "off" the corresponding product. Accordingly, the power is applied to the bases of the second and fourth transistors Q2 and Q4 commonly connected to the second output O2, the second and fourth transistors Q2 and Q4 are turned on, the current flows to the solenoid of the standby power cut-off units 200, 300, and 400 of the products from the point U to the point P, the contact points C1 and C2 of the standby power cut-off units 200, 300, and 400 are open, the power supplied to the product is cut off, and therefore the standby power of the product is completely cut off.

Otherwise, at the time of supplying power when the product is powered off, the main system 10 turns on the electronic product through the cell phone from the outside (for example, a home system), the main system 10 analyzes the used power amount and supplies power for the corresponding electronic product according to the priority (for example, in case of a smart grid controller), the controller 11 selects the driving switch S of the corresponding product in the device selecting and driving unit 13, and transmits a "high" pulse output from the first output O1 of the controller 11. Accordingly, the power is applied to the bases of the first and third transistors Q1 and Q3 commonly connected to the first output O1, the first and third transistors Q1 and Q3 are turned "on", the current flows to the solenoid of the standby power cut-off units 200, 300, and 400 of the products from the point P to the point U, the contact points C1 and C2 of the standby power cut-off units 200, 300, and 400 are connected, the power supplied to the product is supplied, and therefore the products operate normally.

When the control of the main system 10 is not needed, for example, the user goes out, the overall cut-off switch 102 positioned in a certain position at a front door of a house is pressed, or all the electronic products are powered "off", the main system 10 cuts off the wasted power overall.

That is, when the controller 11 of the main system 10 detects that the overall cut-off switch 102 is pressed or all the managed electronic products are not in use, the controller 11 controls the standby power cut-off units 200, 300, and 400 of the electronic product and cuts off the standby power. In addition, the standby power cut-off unit 100 of the main system 10 is controlled through the driving unit 18 as described above to cut off the power supply and completely cut off the power consumption of the main system 10.

At this time, in order to autonomously minimize the power consumption, the main system 10 enters a sleep mode, periodically wakes up to perform basic functions, and maintains the sleep mode. At this time, the sleep mode power unit 14 supplies power only to the communication unit 15, the wireless communication unit 12, and the controller 11.

If there is an interrupt from the outside or recharging is required before the power charged in the sleep mode power unit 14 becomes a reference supply or less, the controller 11 controls the driving unit 18 so that standby power cut-off apparatus 100 of the main system 10 is controlled and the power is supplied to the power unit 19. Accordingly, the system wakes up and performs normal operation as described above.

At this time, the sleep mode power unit 14 is recharged to use the power in the sleep mode so that the system may operate normally with no limitation in performing the functions, and prevent energy consumption and environment contamination by reducing unnecessary power consumption.

Meanwhile, the main system 10 and the standby power cut-off units 100, 200, 300, and 400 of the plurality of the electronic products 20, 30, and 40 may have a structure of the standby power cut-off apparatus as disclosed in Korean Patent Application No. 2009-72016 which is firstly filed by the applicant and registered (entitled APPARATUS FOR CUTTING OFF STANDBY POWER AND METHOD FOR CONTROLLING THEREOF, filed on Aug. 5, 2009) and in International Patent Application No. PCT/KR2010/001388, claiming priority from the Korean Patent Application No. 2009-72016 (International publication No. WO2010/101436, published on Sep. 10, 2010).

The standby power cut-off device disclosed in Korean Patent Application No. 2009-72016 includes a striker that is movable toward a side as a knob switch for powering on or off an electronic product is pressed; a striker contact fixed at a side of the striker to cause a contact point and another contact point of a power cable going to a power supply device of the electronic product to come into contact with or be separated from each other; a core spaced apart from the striker by a predetermined interval, the core including a magnet for maintaining contact between the contact point and the another contact point by attracting the striker, which moves toward the side upon pressing of the knob switch, by a magnetic force thereof; and a solenoid for causing the contact point and the another contact point to be separated from each other by generating a repulsive force with respect to the magnetic force if the electronic product is powered off, and for causing the contact point and the another contact point to come into contact with each other if the electronic product is powered on.

In addition, the standby power cut-off device disclosed in Korean Patent Application No. 2009-72016 further includes a tack knob engaged with the knob switch for receiving a cut off operation and for delivering a predetermined control signal at the time of performing the cut off operation to cut off standby power to a controller.

The present invention may include a recording medium storing a computer readable program including the standby power cut-off system defined as described above, a control method thereof, and a control program for performing the control method.

The standby power cut-off system configured to autonomously cut off the power so that the waste of the standby power is reduced, and the control method thereof may be configured or operated according to an embodiment of the present invention. While the invention has been described in connection with specific embodiments, various modifications may be possible without departing from the scope of the present invention. Therefore, the scope of the invention is not determined by the embodiments described above, but it should be defined as in the appended claims and the equivalents thereto.

Although the configuration and the operation according to an embodiment of the present invention may be made as described above, and the invention has been described in connection with specific embodiments, various modifications may be possible without departing from the scope of the present invention.

The invention claimed is:

1. A standby power cut-off system, comprising:
a plurality of electronic products that are controlled apparatuses, wherein each of the plurality of electronic products comprise a device standby power cut-off unit configured to control standby power by connecting or cutting off a power supply path of input power of a corresponding electronic product;
a main system configured to control the plurality of electronic products by communicating with the device standby power cut-off unit;
wherein the main system comprises:
a device selecting and controlling unit configured to control an operation of the device standby power cut-off unit of each of the plurality of electronic products in order to supply or cut off power of each of the plurality of electronic products,
a main system power unit is provided with external power as input power configured:
to provide power to the main system, and to provide the power for operating each function unit inside the main system;
a main system controller that controls the main system in an integrated manner;
a main system driving unit configured to provide a driving signal to the device standby power cut-off unit under a control of the main system controller,
a main system standby power cut-off unit configured:
to control the standby power by connecting or cutting off a power supply path for the input power provided to the main system power unit according to the driving signal of the main system driving unit by a control of the main system controller, and the main system includes a manual operation switch to provide a corresponding operation signal to the system controller when a user performs operation, and a communication unit configured to perform a control to communicate with the plurality of electronic products when the power is supplied to the plurality of electronic products, and wherein the device selecting and controlling unit is configured to control an operation of the device standby power cut-off unit of a corresponding electronic product in order to supply or cut off power of a corresponding electronic product under a control of the system controller when each of the plurality of electronic products to be controlled are selected.

2. The standby power cut-off system according to claim 1, wherein each of the plurality of electronic products comprises:
- a device power unit configured to receive external power as input power and provides power for operating each function unit inside the corresponding electronic product;
- a device controller configured to control the corresponding electronic product in an integrated manner, and
- a device driving unit configured to provide the driving signal to the device standby power cut-off unit under a control of the controller,
- wherein the device standby power cut-off unit cuts off the standby power by connecting or cutting off a power supply path for the input power provided to the device power unit according to the driving signal of the device driving unit by a control of the controller of the electronic product, and comprises a manual operation switch to provide a corresponding operation signal to the controller at the time of an operation by a user.

3. The standby power cut-off system according to claim 2, wherein at least one of the plurality of electronic products comprises:
- a display and input unit configured to receive function settings from the user and displays an operation state and data,
- a load driving unit configured to drive corresponding connected loads according to the control condition, and
- a device communication unit that communicates with the main system.

4. The standby power cut-off system according to claim 2, wherein at least one of the plurality of electronic products is a computer and comprises a wake-up LAN that is connected to the Internet.

5. The standby power cut-off system according to claim 1, wherein the main system comprises:
- a wireless communication unit that is remotely controlled from an outside.

6. The standby power cut-off system according to claim 5, wherein the main system comprises:
- a sleep mode power unit configured:
  - to stop a power supply by stopping a control and to proceed to a sleep mode if power of the plurality of electronic products are cut off, and
  - to supply a minimum required power,
- wherein the sleep mode power unit is further configured to supply power to the controller, the wireless communication unit, and the communication unit in a restricted manner so that the main system wakes up periodically and performs an operation or wakes up at the time of interruption for supplying power and performing a normal operation.

7. The standby power cut-off system according to claim 5, further comprising:
- an overall cut-off switch that is connected to the main system and configured to receive an operation for cutting off an entire standby power,
- wherein the main system is further configured to cut off the standby power of the entire electronic product, if it is detected that the overall cut-off switch is pressed or all the managed electronic products are not in use.

* * * * *